United States Patent Office 3,394,022
Patented July 23, 1968

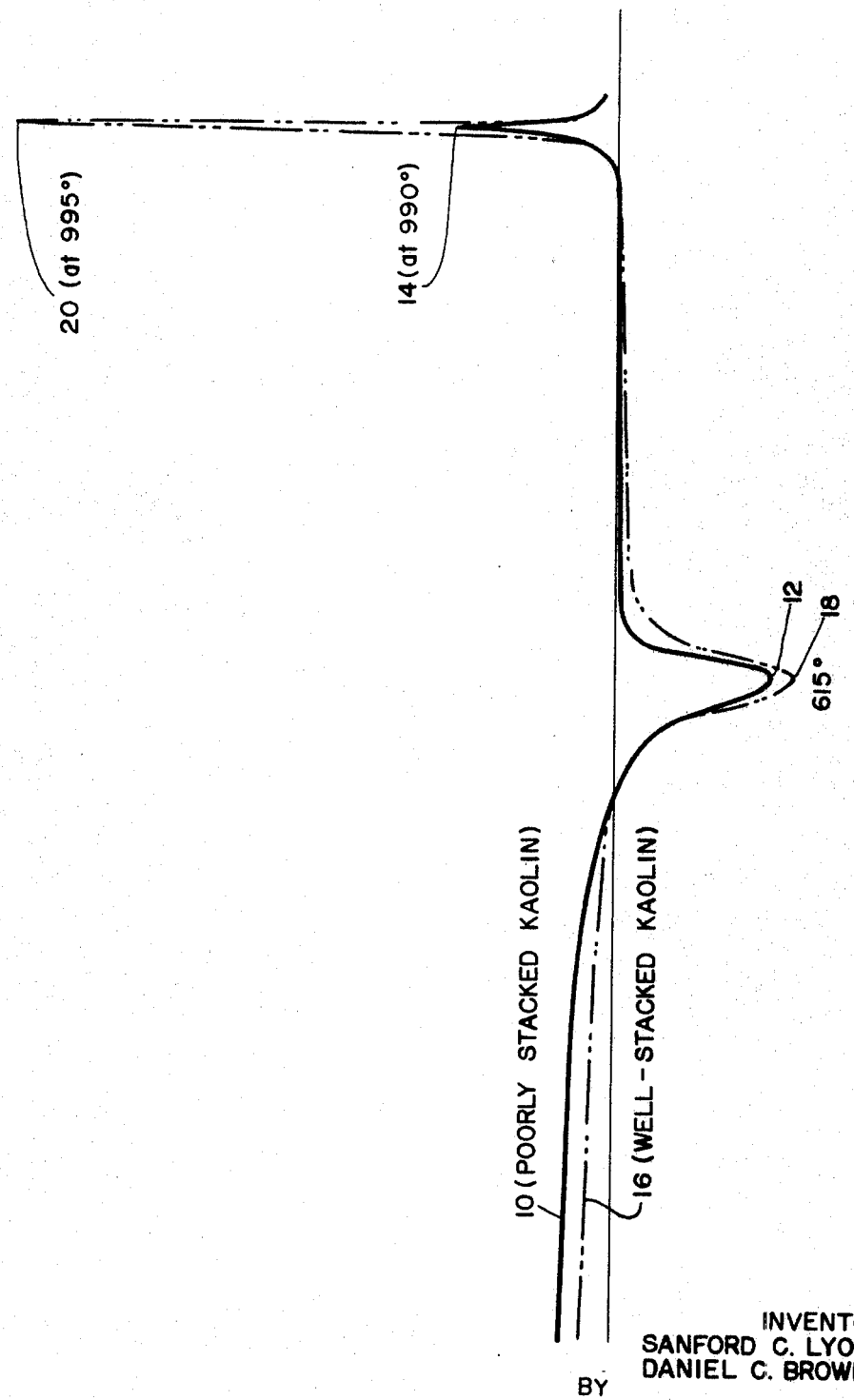

3,394,022
PRODUCTION OF LOW VISCOSITY KAOLINS BY CONTROLLED BLENDING OF HIGH VISCOSITY KAOLINS
Sanford C. Lyons, Bennington, and Daniel C. Brown, Dry Branch, Ga., assignors to Georgia Kaolin Company, Elizabeth, N.J., a corporation of New Jersey
Continuation-in-part of application Ser. No. 495,315, Oct. 12, 1965. This application May 15, 1967, Ser. No. 638,331
2 Claims. (Cl. 106—288)

ABSTRACT OF THE DISCLOSURE

Poorly crystallized, high viscosity kaolins can be blended with well crystallized, high viscosity kaolins in the proper proportions to obtain a blend having a significantly lower viscosity than that of either ingredient regardless of the locations of the sources of the ingredients.

---

Natural, washed, well crystallized kaolin can be blended in proper proportions with poorly crystallized kaolin and the blend subjected to a delaminating process to obtain a product having a viscosity significantly lower than that of either of the starting materials.

The comparative degree of perfection of crystallinity of such kaolins is not practically determinable by such methods as micrography. The preferred criterion for distinguishing the poorly crystallized kaolins from the well crystallized ones is a "Crystallinity Index" determined by use of the ratio between the lengths of the exothermic peaks shown when the respective kaolins are progressively heated to about 1000° C. in a Differential Thermal Analyzer unit.

This application is a continuation-in-part of our pending application Ser. No. 495,315, filed Oct. 12, 1965, for alumino-silicate pigment.

Since the discovery by Maloney (Patent No. 2,158,987) that kaolin particles smaller than 2 microns (E.S.D.) had better glossing and covering power than the larger particles, a discovery that was later explained by electron micrographs showing that practically all kaolin particles less than 2 microns (E.S.D.) are in the form of flat plates, this "fines" fraction of kaolin has found use in every increasing quantities as a coating pigment for paper. The percentage of "fines" in raw clay varies considerably in kaolins from different sources but averages roughly about 50%, the coarse fraction being largely waste material as its utility is quite limited. Some of it has been subjected to delaminating processes (e.g., Patent No. 2,904,267) to increase the yield of "fines," but the demand for coating clay has grown to enormous proportions and the known supplies of raw clay are limited. For use as a paper-coating material, the clay must have a relatively low viscosity. There are large deposits in South Carolina, Georgia and Alabama of kaolins consisting of 80% or more of fines which provide a high gloss when used as a coating for paper, but which have such high viscosities that they are unsuitable for application to paper on a commercial scale. Micrographs of these clays show them to consist of poorly formed crystals which can be described as "poorly-stacked," whereas the clay commonly used for coating paper consists mostly of well formed crystals which can be described as "well-stacked." The latter term is used to describe kaolin particles whose component atomic sheets are arranged in orderly configuration suggestive of a deck of playing cards. The terms "well-crystallized" and "well-ordered" are used as equivalents of "well-stacked." The correlation of kaolinite crystallinity with chemical and physical properties of kaolins is discussed in two papers by H. H. Murray and S. C. Lyons: "Correlation of Paper Coating Quality With Degree of Crystal Perfection of Kaolinite," reprinted from National Research Council Publication 456, 1956, pp. 31–40, and "Further Correlations of Kaolinite Crystallinity With Chemical and Physical Properties," reprinted from Eight National Conferences on Clays and Clay Minerals," Pergamon Press, 1960. In general, poorly-stacked kaolins have higher viscosities than well-stacked kaolins.

In commercial coating practice, it has been found desirable that clays destined for high-speed coating use be of low viscosity in both low-shear and high-shear ranges.

It may assist in understanding the test data hereinafter given if we point out that the "viscosity" of a kaolin destined for paper making is determined by making the clay into a suspension at a comparatively high solids-concentration, e.g., from about 65% to 71% solids content while the clay is in a state of complete electro-kinetic dispersion.

These aqueous test slurries are customarily measured by the North American kaolin industry by means of the so-called Brookfield viscometer for determination of "low-shear" viscosity. At present, the industry assumes that a clay which will yield an aqueous slurry with a Brookfield viscosity of less than about 500 centipoises (at 71% solids content) is a "low viscosity" product. "Medium" viscosity or "high" viscosity materials might range up to 1500 centipoises, or even off-scale at this solids content necessitating further dilution to a degree which will permit measurement.

The "high-shear" viscosity values are usually determined on the same type of aqueous clay suspension but by a different type of viscometer.

While there are several different types of viscometers in use for this purpose, probably the one most widely used in North America is the so-called "Hercules" viscometer. This unit traces a rheogram on a chart, and from this chart the viscosities corresponding to various intensities of shear-rate can be read off and computed.

We express this viscosity value in terms of a so-called "Hercules Tangent" which expresses the rate of shear in sec.$^{-1} \times 10^3$ divided by the shearing force expressed in dyne=cm.$\times 10^5$. This "tangent" is a rapid, reasonably valid index of the viscosity of the slurry at the highest rate-of-shearing at which this measurement was made. Admittedly, these shear-intensities may not be in ranges as high as those observed in actual coating practice, but extensive industrial experience has shown them to be reliable indicators of the probable behavior of the clay in practice. It may be pointed out that the higher the numerical value of the "tangent," the lower will be its viscosity.

Many "poorly-stacked," fine-particle kaolins which show excellent high-shear values have been considered unsuitable for commercial coating purposes, partly because they were so stiff and unworkable at low-shear as to be very difficult to "makedown" during preparation of the coating "colors." Likewise, they posed significant processing problems during their own refinement, as a concomitant of this high viscosity.

On the other hand, other "well-stacked" kaolins which gave excellent Brookfield, low-shear viscosity values were often so viscous at high rates of shear that they could not be efficiently applied as coatings to paper because they would not yield high-solids coating "colors" to provide fluidity sufficient to permit their application to the paper-web smoothly at these high-solids concentrations. The high-solids concentration is necessary in order to minimize the transit time necessary for their drying after application to the finished coated-web, thus avoiding "sticking" or "offsetting" at subsequent points of contact with dryer-rolls.

Therefore, if a technique could be found whereby a kaolin of inherently good low-shear viscosity could be rationally and predictably blended with another clay of natively good high-shear viscosity, but of poor low-shear viscosity, it would provide a very helpful production method for the kaolin producer if the resulting blend did not also reflect the poor lower-shear viscosity of the second component.

We have discovered that there are certain divergent types of kaolins which can be blended, in controlled proportions, to produce such desirable products, and we have found test techniques whereby the necessary evaluative criteria for each of the component kaolins can be readily and simply predetermined.

It is not enough, as far as we are aware, to depend on viscosity tests alone for blending high-viscosity kaolins to obtain a product with significantly lower viscosity. One of the ingredients of the blend must be well-stacked kaolin. Furthermore, the ingredients must be practically free from non-kaolinitic clays such, for example, as montmorillonite.

In order to be of practical value to the coating-clay producer, it will be obvious that some simple, rapid, test method must be available, whereby he can evaluate his various crude clays in terms which will permit him to predetermine whether certain types of viscous crudes can be blended together in order to produce blends with acceptable flow-properties.

To find the "Stacking Index" or degree of perfection of stacking of a kaolin sample, micrographic methods are impractical because the atomic sheets are very thin— only 7.15 A. units, and most of the individual particles are too small. Investigation by means of an X-ray diffraction spectrometer is possible but is rather slow, and interpretation is complex. A practical rapid method of determining comparative degrees of "stacking perfection" is by means of differential thermal analysis (D.T.A.). It has been found that when kaolin is heated strongly, there is a sudden exothermic reaction when the temperature reaches about 990° C., and the magnitude of the reaction is a measure of the stacking perfection of the sample, the well-stacked crystals having a stronger reaction than the poorly-stacked crystals. The relative magnitude of the exothermic reactions can be indicated by peaks traced on a strip chart, the length of a peak being a fair measure of the perfection of stacking. If a given sample of kaolin is adopted as a standard, the ratio of lengths of the exothermic peaks of the standard sample and the unknown sample can for the purposes of this invention be taken as the "Stacking Index" of the latter, provided that the same apparatus is used in making the comparative tests.

For information concerning Differential Thermal Analyzing techniques, see "Thermo-Analytical Methods of Investigation" by Paul D. Garn, Academic Press, New York, 1965.

On the drawing two graphs are given from tests of typical well-stacked and poorly-stacked kaolins on a D.T.A. instrument. Each graph indicates endothermic and exothermic reactions of the test substance as it is steadily heated to temperatures up to 1000° C. If a chemical or molecular change occurs in the substance accompanied by the absorption or production of heat, the endothermic reactions are recorded by dips in the graph while the exothermic reactions are recorded by peaks.

The graph 10 indicates that when a poorly-stacked kaolin is steadily heated, an endothermic reaction 12 occurs when its temperature reaches about 600° C. and an exothermic reaction 14 occurs when it reaches about 990° C. Much the same happens in the graph 16 which shows an endothermic reaction 18 at about 600° C. and an exothermic peak 20 at 995° C. The conspicuous difference between the graphs is the height of the peaks 14 and 20, the latter being much the greater. We have found that the height of such peaks may be taken as a measure of the degree of perfection of the stacking of the kaolin being tested, the tests being made on the same apparatus. By adopting a superior kaolin as a standard, a Stacking Index can be calculated by dividing the measured height of the exothermic peak of a sample kaolin by the height of the peak on the graph of the adopted standard kaolin. For example, if the kaolin sample from which the graph 16 was made is taken as the standard, the Stacking Index of the poorly-stacked sample would be found by dividing the height of its peak 14 by the height of the peak 20 of the well-stacked standard sample, that is, 0.27.

If any appreciable amount of non-kaolinitic material, such as montmorillonite, is present in the clay which is being tested by a D.T.A. unit, its presence will be manifested by an endothermic reaction at a temperature considerably lower than 600° C. In such case the montmorillonite, being composed of exceedingly fine particles, can often be removed by a classification operation.

As described in said application Ser. No. 495,315, by blending a well-stacked kaolin, such as the delaminated product obtained by the method described in Patent No. 2,904,267, with a minor proportion of a poorly-stacked kaolin, a new and improved pigment can be obtained suitable for use in coating paper.

We have now discovered that if we blend a coarse-particle well-stacked kaolin with a poorly-stacked unfractionated natural kaolin in correct proportions, and then "superstrude" the mixture in accordance with the method described in Patent No. 2,904,267, a fine-particle alumino-silicate product is obtained with a suitably low viscosity. To compare the results of this procedure with the result of blending a previously superstruded kaolin with a poorly-stacked natural kaolin, we performed the following experiments.

(A) A coarse-particle, well-stacked kaolin was superstruded and classified after extrusion so that it contained about 80% fines (particles smaller than 2 microns, e.s.d.). Sample #1.

A poorly-stacked kaolin was classified, without extrusion, so that it contained about 92% fines. Sample #2.

(B) 90 parts by weight of coarse-particle, well-stacked kaolin were blended with 10 parts of poorly-stacked natural kaolin. The blend was superstruded (three passes at 82% solids through a die plate with holes ⅛" in diameter). The extruded product was slurried and classified by sedimentation, a fines fraction containing about 80% fines being recovered. Sample #3.

A blend was made of 80% of superstruded fine clay (Sample #1) and 20% of natural fine clay (Sample #2) to form Sample #4.

To measure the viscosities of the four samples, attempt was made to slurry each sample to the standard 71% solids, deflocculated, this percentage being customarily used in testing for viscosity.

Sample #1 could not be slurried to higher than 68.9% solids, and its slip was so dilatant and viscous that neither the high-shear nor the low-shear viscosity could be measured at 71% solids concentration.

The comparative flow-properties of the four samples are shown in the following table:

TABLE I

| Sample | D.T.A. Exotherm | Viscosity | | |
|---|---|---|---|---|
| | | Brookfield | | Hercules Tangent |
| | | 10 r.p.m. | 100 r.p.m. | |
| #1 | 86 mm. | Off scale | Off scale | Off scale. |
| #2 | 34 mm. | 2,100 cpe | 485 cpe | 7.33. |
| #3 | | 749 cpe | 255 cpe | 0.311. |
| #4 | | 950 cpe | 350 cpe | 0.256. |

This table shown (1) that the blends, #3 and #4, of well-stacked ond poorly-stacked kaolins have viscosities considerably lower than the viscosities of the individual ingredients (#1 and #2), and (2) that this reduction in viscosity occurs both for a blend made after superstrusion of the well-stacked kaolin (#4) and a blend made before superstrusion (#3).

We have also found that a product of reduced viscosity is obtained by blending delaminated well-stacked kaolin with poorly-stacked kaolin regardless of whether the method of delamination is that of superstrusion as described in Patent No. 2,904,276 or of wet-attrition by nylon pellets as described in Patent No. 3,171,718.

TABLE II

Sample #1. Nylon delaminated well-stacked kaolin (fines).
Sample #2. Poorly-stacked kaolin.
Sample #3. Blend of 90% Sample #1 and 10% Sample #2.
Sample #4. Blend of 80% Sample #1 and 20% Sample #2.
Sample #5. Superstruded well-stacked kaolin (fines).
Sample #6. Blend of 90% Sample #5 and 10% Sample #2.
Sample #7. Blend of 80% Sample #5 and 20% Sample #2.

| Sample | D.T.A. Exotherm | Viscosity Brookfield | | Hercules Tangent |
|---|---|---|---|---|
| | | 10 r.p.m. | 100 r.p.m. | |
| #1 | 90 mm | 1,100 cpe | 346 cpe | 0.166 |
| #3 | | 1,020 cpe | 286 cpe | 0.172 |
| #4 | | 820 cpe | 280 cpe | 0.222 |
| #2 | 42 mm | 1,600 cpe | 460 cpe | 4.68 |
| #5 | 86 mm | 1,140 cpe | 338 cpe | 0.106 |
| #6 | | 760 cpe | 212 cpe | 0.189 |
| #7 | | 740 cpe | 206 cpe | 0.261 |

Note that both the nylon-delaminated well-stacked kaolin (Sample #1) and the superstruded well-stacked kaolin (Sample #5) showed a high Brookfield viscosity and a poor Hercules value, yet the 80:20 blends of both of these well-stacked clays with the poorly-stacked Sample #4, showed better Brookfield values than either component and acceptable high-shear values.

The production of low-viscosity blends of well-stacked and poorly-stacked kaolins does not depend on the localities from which the ingredients are supplied. In Table III viscosities are given of blends of well-stacked kaolin from Washington County, Ga., with poorly-stacked kaolins from McDuffie County and Twiggs County, Ga.

TABLE III.—COMPARIXON OF FLOW-PROPERTIES OF BLENDS OF POORLY-STACKED AND WELL-STACKED NATURAL KAOLINS

Sample #1. Well-stacked (Washington County) kaolin (fines).
Sample #2. Poorly-stacked (McDuffie County) kaolin (fines).
Sample #3. 90% Sample #1 and 10% Sample #2.
Sample #4. 80% Sample #1 and 20% Sample #2.
Sample #5. Poorly-stacked (Twiggs County) kaolin (fines).
Sample #6. 90% Sample #1 and 10% Sample #5.
Sample #7. 80% Sample #1 and 20% Sample #5.

| Sample | D.T.A. Exotherm | Viscosity Brookfield | | Hercules Tangent |
|---|---|---|---|---|
| | | 10 r.p.m. | 100 r.p.m. | |
| #1 | 105 mm | 300 cpe | 168 cpe | 0.411 |
| #3 | | 280 cpe | 128 cpe | 0.472 |
| #4 | | 240 cpe | 130 cpe | 0.633 |
| #2 | 34 mm | 800 cpe | 214 cpe | 7.33 |
| #6 | | 260 cpe | 128 cpe | 0.472 |
| #7 | | 240 cpe | 130 cpe | 0.633 |
| #5 | 68 mm | 460 cpe | 206 cpe | 4.68 |

Here we are blending a well-stacked natural clay which has not been delaminated, with two different natural kaolins, each of which shows a shorter DTA exotherm peak than does the well-stacked specimen.

The poorly-stacked Specimen #2 gave a very short peak, viz., 34 mm., while the other poorly-stacked Specimen #5 gave a corresponding peak 68 mm. long.

It is interesting to note that the 10 r.p.m. Brookfield viscosity of Specimen #2 was 800 cpe., and its Hercules tangent was 7.33, whereas the corresponding values for Specimen #5 were 460 cpe. and 4.68, respectively.

It is also interesting to note that when these poorly-stacked components were blended with Specimen #1, the resulting blends showed practically identical improved flow properties.

We tried blending well-stacked kaolins of nearly equal crystallinity from different sources to see whether improvements comparable to the foregoing could be obtained from them. As will be seen in Table IV, below, the well-stacked kaolin from Twiggs County did not produce any blends with well-stacked kaolin from Washington County which were of better flow-properties than either component alone.

TABLE IV.—COMPARISON OF FLOW-PROPERTIES OF BLENDS OF TWO WELL-STACKED KAOLINS

Sample #1. Well-stacked kaolin from Twiggs County, Georgia.
Sample #2. Well-stacked kaolin from Washington County, Georgia.
Sample #3. 90% Sample #1 and 10% Sample #2.
Sample #4. 80% Sample #1 and 20% Sample #2.

| Sample | D.T.A. Exotherm | Viscosity Brookfield | | Hercules Tangent |
|---|---|---|---|---|
| | | 10 r.p.m. | 100 r.p.m. | |
| #1 | 104 mm | 260 cpe | 139 cpe | 5.64 |
| #3 | | 240 cpe | 140 cpe | 2.34 |
| #4 | | 260 cpe | 169 cpe | 0.506 |
| #2 | 98 mm | 340 cpe | 166 cpe | 0.366 |

For a better understanding of the significance of high-shear and low-shear viscosity, reference can be had to published technical literature on this subject, such, for example, as "Viscosity and Flow Measurements" by J. B. Van Wazer, J. Lyons, K. Y. Kinn and R. E. Colwell, New York, Interscience 1963, pp. 167–170.

"The Hercules High-Shear Viscometer" by J. W. Smith and P. D. Applegate, Tech. Assoc. Papers 31:208, (1948).

During the past 20 years or so, many experimenters have sought for methods for reducing and/or controlling the viscosity of the kaolins which were available to them because it was often necessary to abandon sections of mines in which the kaolin was suitable for them in every respect, except that its viscosity was higher than the acceptable specification. Many processes have been developed and many patents have issued thereon.

As examples of a few, we mention—among others—two patents issued to Millman et al. Nos. 2,535,647 and 2,907,666. Both of these patents describe methods intended for reducing viscosity of kaolins by mechanical kneading thereof with the assumed effect of breaking the kaolinite platelets crosswise. The first-named patent discloses a kneading process wherein the raw kaolin is mechanically treated while in a fully deflocculated state. The second-named patent describes a process which is similar except that the kaolin is in a fully flocced state while being mechanically treated. In neither of these patents is there any reference whatsoever made to the degree of stacking perfection of the crude material to be processed.

A more recent patent, No. 3,301,691, issued to Hemstock and Bergmann, discloses a rather complex process wherein the crude kaolin is first mechanically kneaded or hydraulically sheared and then subjected to an autoclaving treatment under conditions of elevated temperature and pressure. Here, again, no reference whatsoever is made to the effect of the degree of stacking perfection of the raw clay being so treated.

Still another patent, No. 3,303,035, recently issued to Hemstock and Bergmann describes a process wherein the kaolin is treated with a salt of fluorine under special conditions. Here, too, no recognition of the significance of the relative stacking perfection of the feed kaolin is found.

A study of this cited patent art will reveal the fact that our process of rational, controlled blending of crude kaolins based on their respective D.T.A. exotherm lengths, provides a novel, relatively simple and inexpensive method for viscosity control of kaolins of the type found in the Southeastern U.S.A.

We claim:
1. A method of producing a kaolin product suitable for coating paper, which comprises mechanically delaminating the coarse fraction of a washed, well-stacked kaolin, recovering the fines fraction from the delaminated mass, blending said fines fraction with be- tween 50% and 10% of natural poorly-stacked fines to obtain a product having a viscosity significantly lower than that of either ingredient of the blend.

2. A method of producing a kaolin product suitable for coating paper, which comprises blending the coarse fraction of a washed, well-stacked kaolin with a natural, poorly-stacked kaolin in the proportion of from 90% to 50% of the well-stacked kaolin to 10%–50% of the poorly-stacked kaolin, both kaolins being substantially free from montmorillonite, and mechanically delaminating the blend.

References Cited
UNITED STATES PATENTS

| | | | |
|---|---|---|---|
| 2,904,267 | 9/1959 | Lyons | 106—72 |
| 3,034,859 | 5/1962 | Gunn et al. | 23—110.2 |
| 3,106,476 | 10/1963 | Millman et al. | 106—309 |
| 3,274,011 | 9/1966 | Duke | 106—72 |
| 3,301,691 | 1/1967 | Hemstock et al. | 106—72 |
| 3,303,035 | 2/1967 | Hemstock et al. | 106—72 |

JAMES E. POER, Primary Examiner.